(12) United States Patent
Bull et al.

(10) Patent No.: US 11,070,422 B2
(45) Date of Patent: Jul. 20, 2021

(54) ENABLING ENTERPRISE SEGMENTATION WITH 5G SLICES IN A SERVICE PROVIDER NETWORK

(71) Applicant: Cisco Technology, Inc., San Jose, CA (US)

(72) Inventors: Oliver James Bull, Bristol (GB); Rex Emmanuel Fernando, Fremont, CA (US); Anand Oswal, Pleasanton, CA (US); Kausik Majumdar, San Ramon, CA (US); Darren Russell Dukes, Ontario (CA); Sanjay Kumar Hooda, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/571,365

(22) Filed: Sep. 16, 2019

(65) Prior Publication Data
US 2021/0083933 A1 Mar. 18, 2021

(51) Int. Cl.
*H04L 12/26* (2006.01)
*H04L 12/24* (2006.01)
(Continued)

(52) U.S. Cl.
CPC ...... *H04L 41/0806* (2013.01); *H04L 41/0893* (2013.01); *H04L 43/08* (2013.01);
(Continued)

(58) Field of Classification Search
None
See application file for complete search history.

(56) References Cited

U.S. PATENT DOCUMENTS

2015/0063166 A1* 3/2015 Sif ...................... G06F 9/45558
370/254
2018/0352501 A1* 12/2018 Zhang ................... H04W 48/14
(Continued)

OTHER PUBLICATIONS

D. Dukes, et al., "SR for SDWAN: VPN with Underlay SLA draft-dukes-spring-sr-for-sdwan-00", Network Working Group, Jun. 5, 2018, 19 pages.
(Continued)

*Primary Examiner* — Edan Orgad
*Assistant Examiner* — Emmanuel K Maglo
(74) *Attorney, Agent, or Firm* — Edell, Shapiro & Finnan, LLC

(57) ABSTRACT

An enterprise controller of an enterprise network sends to a service gateway of a service provider network a request for network slice information about network slices provisioned on a data plane of the service provider network. Responsive to the sending, the enterprise controller receives from the service gateway the network slice information including identifiers of and properties associated with the network slices. Responsive to receiving a request for the network slice information from a network device at a border of a forwarding plane of the enterprise network, the enterprise controller sends the network slice information to the network device to cause the network device to perform configuring network traffic in the forwarding plane with identifiers of ones of the network slices that match the network traffic, and to perform forwarding the network traffic configured with the identifiers to the data plane of the service provider network.

20 Claims, 15 Drawing Sheets

(51) Int. Cl.
  *H04L 12/851* (2013.01)
  *H04L 12/815* (2013.01)
  *H04L 12/813* (2013.01)
  *H04W 84/04* (2009.01)
  *H04W 88/16* (2009.01)
(52) U.S. Cl.
  CPC .............. *H04L 47/20* (2013.01); *H04L 47/22* (2013.01); *H04L 47/24* (2013.01); *H04W 84/042* (2013.01); *H04W 88/16* (2013.01)

(56) References Cited

U.S. PATENT DOCUMENTS

| | | | | |
|---|---|---|---|---|
| 2018/0368056 A1* | 12/2018 | Wang | .................... | H04W 48/18 |
| 2019/0014515 A1* | 1/2019 | Zee | ........................ | H04W 76/27 |
| 2019/0037409 A1* | 1/2019 | Wang | .................... | H04W 16/04 |
| 2019/0260641 A1* | 8/2019 | Giust | .................... | H04L 67/141 |
| 2020/0045753 A1* | 2/2020 | Dao | ........................ | H04W 4/08 |
| 2020/0169951 A1* | 5/2020 | Cai | ........................ | H04W 48/18 |
| 2020/0275410 A1* | 8/2020 | Kodaypak | ......... | H04W 28/0226 |

OTHER PUBLICATIONS

Cisco, "The Cisco Digital Network Architecture Vision—An Overview", Cisco White Paper, 2016, 27 pages.
Cisco, "Introduction to Segment Routing", Segment Routing Configuration Guide, Cisco IOS XE Release 3S, 8 pages, downloaded Sep. 13, 2019.
5GPPP, "View on 5G Architecture", 5GPPP Architecture Working Group, 5G Architecture White Paper, Version 2.0, Dec. 15, 2017, 1-70 pages.
5GPPP, "View on 5G Architecture", 5GPPP Architecture Working Group, 5G Architecture White Paper, Version 2.0, Dec. 15, 2017, 71-140 pages.

* cited by examiner

ENABLING ENTERPRISE SEGMENTATION WITH 5G SLICES IN A SERVICE PROVIDER NETWORK

TECHNICAL FIELD

The present disclosure relates to enabling enterprise network segmentation with 5G slices in a service provider network.

BACKGROUND

Today an enterprise, i.e., an enterprise network, increasingly offloads its infrastructure into the public cloud. With the arrival of 5G networks, it is predicted that billions of devices will be added to network edges, which are part of fixed or mobile networks. The devices will be operating across multiple network domains, all which may be segmented for services of the network domains, not only across the 5G networks but also extended through to the enterprise network.

Due to these changes, major services or applications running on public or private clouds, such as machine-to-machine (m2m) and data in-and-data out of data centers, are projected to grow. This will bring scalability limitations for m2m communication and for mission critical applications due to the lack of service policy enforcement and segmentation. Some of these applications require differentiated transport services, e.g., packet latency, packet loss, packet jitter, packet disjointedness, packet replication, and packet segmentation. As devices are connected across heterogeneous networks, transport and segmentation services for the devices should be provided end-to-end (e2e) across the network domains.

DESCRIPTION OF EXAMPLE EMBODIMENTS

Overview

Figure 1:
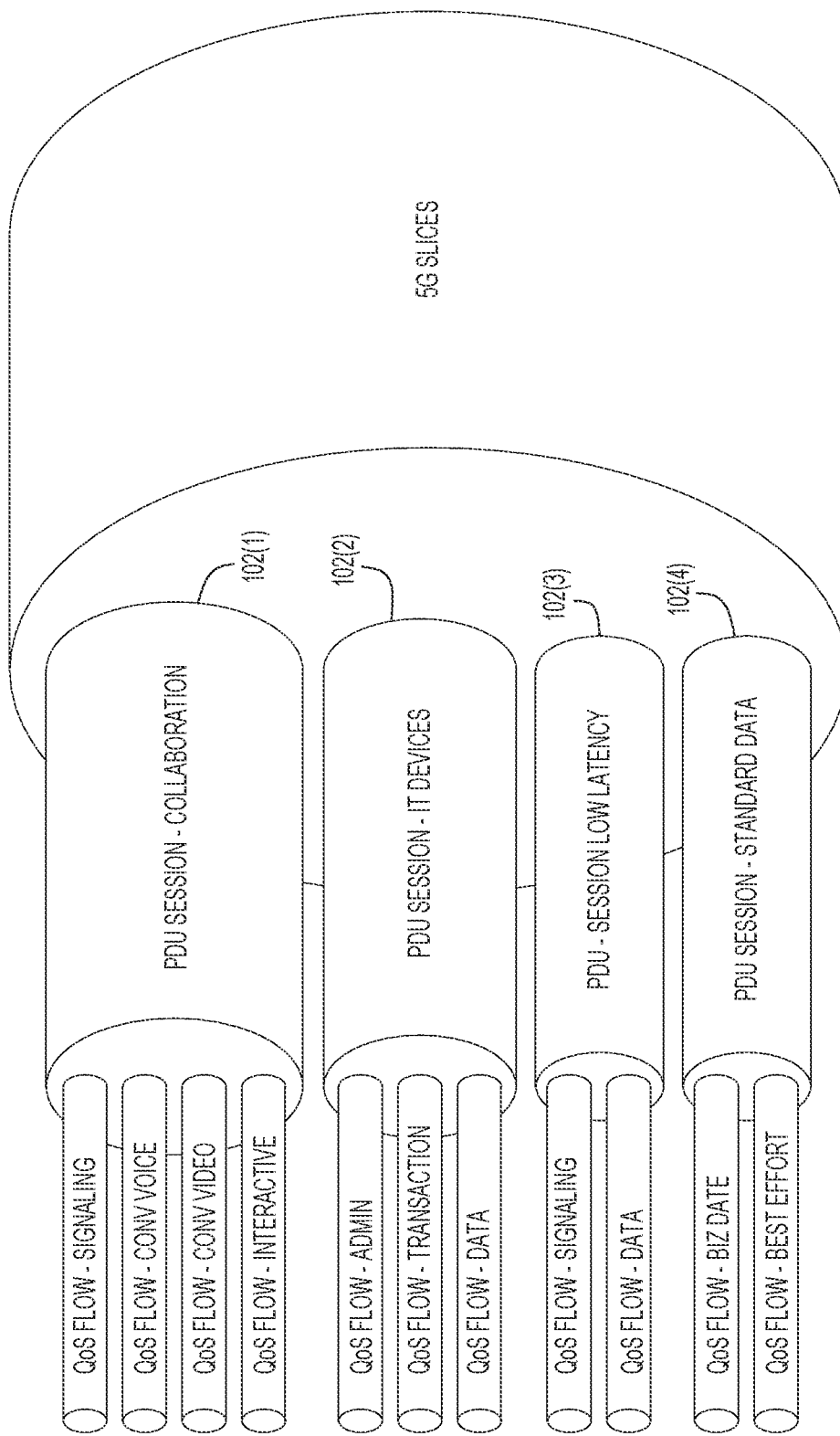
FIG. 1 is a conceptualized illustration of 5G network slicing that may be applied to different types of network traffic of an enterprise network, according to an example embodiment.

An enterprise controller of an enterprise network sends to a service gateway of a service provider network a request for network slice information about network slices provisioned on a data plane of the service provider network. Responsive to the sending, the enterprise controller receives from the service gateway the network slice information including identifiers of the network slices and properties associated with the network slices. Responsive to receiving a request for the network slice information from a network device at a border of a forwarding plane of the enterprise network, the enterprise controller sends the network slice information to the network device to cause the network device to perform configuring network traffic in the forwarding plane with identifiers of ones of the network slices that match the network traffic, and to perform forwarding the network traffic configured with the identifiers of the ones of the network slices to the data plane of the service provider network.

Example Embodiments

Third ($3^{rd}$) Generation Partnership Project (3GPP) 5G (hereinafter "5G") holds the promise of "network slicing" to provide 5G network slices (referred to simply as "slices"), which may be applied to a level of granularity of an enterprise network. Therefore, there is an opportunity to extend enterprise network segments of the enterprise network to service provider 5G slices, so that the enterprise network can leverage service provider 5G infrastructure, to extend enterprise network segments to remote sites and cloud environments, end-to-end across the heterogeneous networks. Embodiments presented herein provide ways to extend enterprise transport services and segmentation over the service provider 5G slices.

Before delving into how the enterprise network segments are mapped/carried using service provider 5G slices, 5G network slicing is described briefly. Service provider 5G network slicing enables a service provider to build virtual end-to-end networks tailored to application requirements. At the service provider, a network core that supports 5G virtualization uses 5G network slicing to support multiple virtual networks over a physical infrastructure or data plane. The data plane, also referred as the forwarding plane, is the part of a network that carries/routes/forwards user traffic. 5G network slicing permits a logical separation of a physical network into distinct (virtualized) 5G slices so that each slice provides unique connectivity characteristics, but all 5G slices run on the same shared physical network infrastructure. A given 5G slice supports a communication service of a particular connection type with a specific way of handling the data plane and the control plane for the service. Thus, 5G network slicing creates unique services that are customized for various use cases such as Internet of Things (IoT), automated cars, streaming video, remote health care, and so on. 5G network slicing creates virtual networks for applications that require separate blends of performance, capacity, latency, security, reliability, and coverage, for example.

With reference to FIG. 1, there is a conceptualized illustration of 5G network slicing that may be applied to different types of enterprise network traffic (simply referred to as "traffic"). The 5G network slicing supports multiple concurrent protocol data unit (PDU) connections or sessions 102 (1)-102(4) (collectively, "PDU sessions 102"). The distribution of PDU sessions 102 is driven by enterprise end-service and service application function requirements. PDU Sessions 102 may be used when separate network anchor points are used. Each PDU session 102(i) may support multiple quality of service (QoS) flows of traffic. Each QoS flow may be associated with a distinct level of QoS. Thus PDU sessions 102 expose granularity of QoS management and traffic segmentation to the enterprise network. 5G network slicing may apply a unique 5G slice for a given enterprise network customer for complete control of QoS flows, network anchor points, and traffic characteristics.

Figure 2:
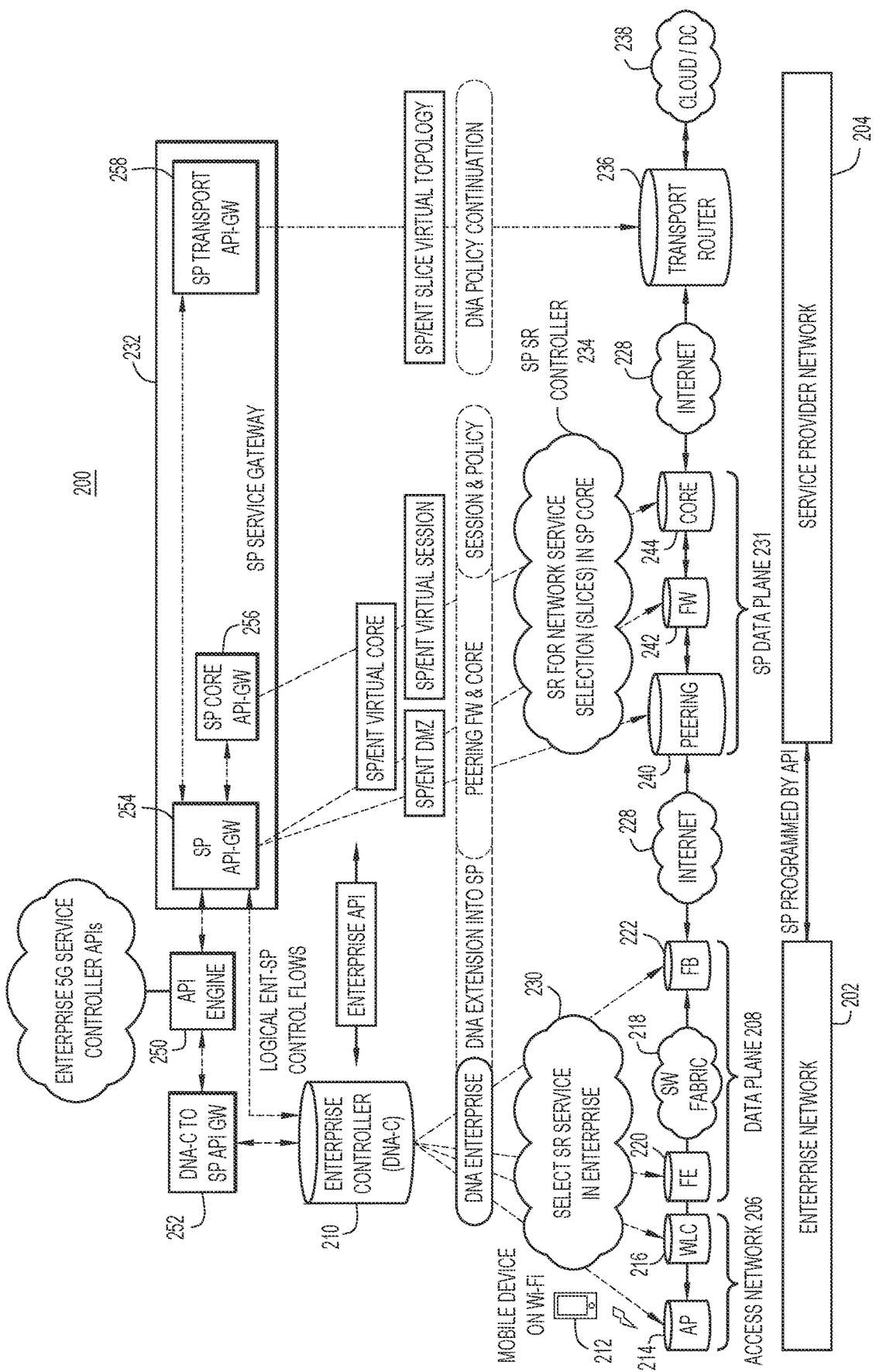
FIG. 2 is a block diagram of an enterprise 5G Network-as-a-Service (NaaS), including an enterprise network and a service provider (SP) network, in which embodiments presented herein may be implemented, according to an example embodiment.

With reference to FIG. 2, there is a block diagram of an example enterprise 5G network as a service (NaaS) 200 (more simply referred to as a "network environment" 200) in which embodiments presented herein may be implemented. FIG. 2 shows extensions of services and functions of an enterprise network 202 (shown primarily on the left-hand side of FIG. 2) to a service provider (SP) network 204 (shown primarily in the middle and on the right-hand side of FIG. 2) that supports 5G network slicing.

Enterprise network 202 includes an access network 206, an enterprise data plane 208 (also referred to as a "forwarding plane 208"), and an enterprise controller 210 to perform overall control of the enterprise network, generally, and to control the access network and the data plane. Access network 206 provides a mobile device 212 with access to data plane 208. Access network 206 includes an access point (AP) 214 through which mobile device 212 accesses or attaches to the access network, and a wireless local area network (LAN) controller (WLC) 216 to control the access point. In practice, access network 206 includes many mobile devices many APs, and many WLCs, although only one of each is shown in FIG. 2 for the sake of clarity. In practice, a fixed or mobile device is attached to an enterprise access network, e.g., the mobile device may be wirelessly attached or wired to access network 206.

Enterprise data plane 208 carries (user) traffic in the form of Internet Protocol (IP) packets to and from access network 206. Generally, data plane 208 includes network devices, such as switches and routers. Data plane 208 includes a switch fabric 218 comprising a fabric of interconnected switches (not specifically shown in FIG. 2), a fabric edge (FE) switch 220 connected to an edge of the switch fabric and access network 206, and a fabric border (FB) router 222 connected to an edge of the switch fabric (i.e., connected to a border of data plane 208) and to service provider network 204. FE switch 220 switches the traffic between access network 206 and switch fabric 218, switch fabric 218 routes the traffic in data plane 208, and FB router 222 forwards the traffic between the switch fabric and service provider network 204 through a network 228, as described below. Network 228 may include one or more wide area networks (WANs), such as the Internet, and one or more LANs.

Enterprise controller 210 may be implemented as a Cisco digital network architecture (DNA)-center (DNA-C), for example. Enterprise controller 210 includes control plane applications, shown generally at cloud 234, configured to communicate with and assert control over access network 206 and data plane 208. For example, control plane applications 230 may select segment routing (SR) services in data plane 208 for enterprise network 202.

SP network 204 includes an SP data plane 231, an SP service gateway 232 (also referred to simply as a "service gateway 232" of the SP network), and an SP SR controller, shown generally at cloud 234 (also referred to simply as an "SR controller 234" of the SP network). SP service gateway 232 performs access and session management operations for SP network 204, communicates with enterprise controller 210 of enterprise network 202 over a network, and communicates with other components and applications of SP network 204, such as SP SR controller 234. SP service gateway 232 acts as a conduit for messages, e.g., request and responses, between enterprise controller 210 and the other components and applications of SP network 204, such as SP SR controller 234.

Figure 12:
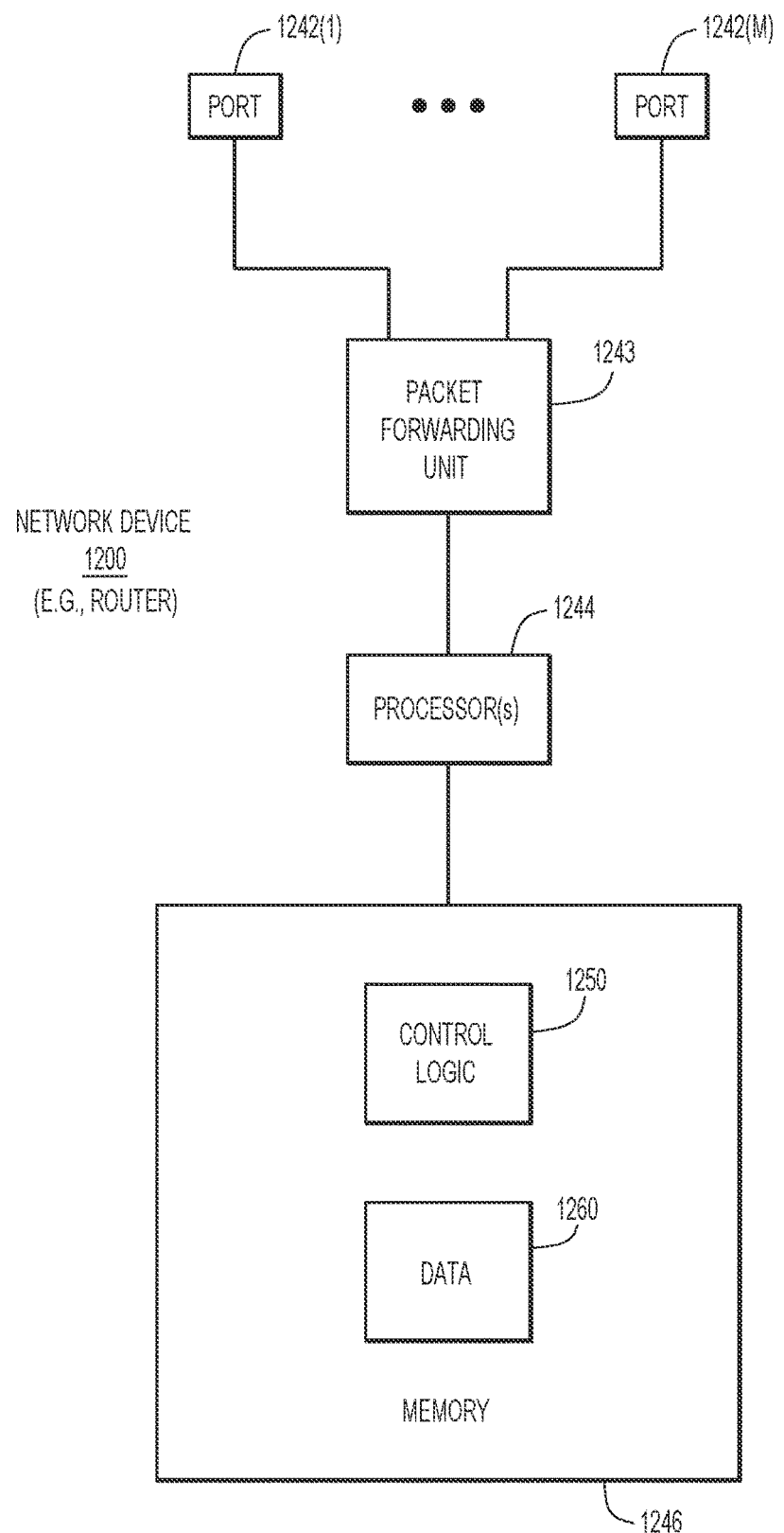
FIG. 12 is a block diagram of a network device configured to perform techniques described herein, according to an example embodiment.
Figure 13:
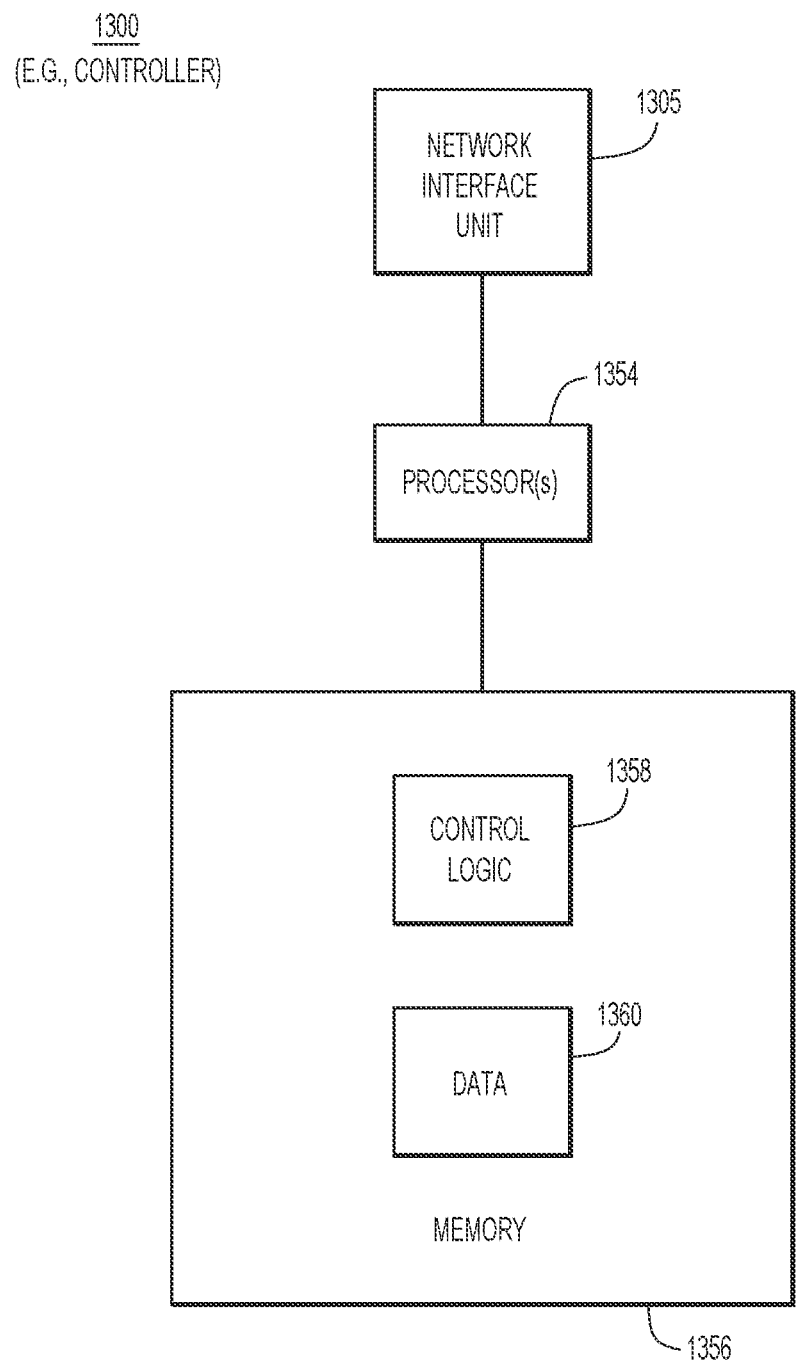
FIG. 13 is a block diagram of a controller device configured to perform techniques presented herein, according to an example embodiment.

SP SR controller 234 manages 5G network slicing on SP data plane 231. For example, SP SR controller 234 provisions 5G slices on the SP data plane 231 and maintains configuration information about the 5G slices that are provisioned, such as identifiers of the 5G slices and properties associated with the 5G slices. Distinct properties of the 5G slices may include latency, bandwidth, virtualized network function (VNF) service, and high quality service, to name a few. Thus, SP SR controller 234 manages SR for network service slices in SP data plane 231. The VNF includes any function implemented by a dedicated systems (e.g., as shown in FIG. 12, described below) or virtualized on a general compute system (e.g., as shown in FIG. 13).

SP data plane 231 generally includes network devices, such as switches and routers, to carry traffic received from and destined for data plane 208 of enterprise network 202. SP data plane 231 implements 5G slices under control of SP SR controller 234, and applies the 5G slices to the traffic as appropriate, as described below. SP data plane 231 may be extended to include a transport router 236 that communicates with a cloud-based data center 238. SP data plane 231 includes an provider edge or peer router 240 connected to network 228, a firewall 242 connected to the provider edge router, and a core SP network 244 connected to the firewall and network 228 and configured to implement 5G slices and segment routing in the 5G slices.

Enterprise controller 210 and SP service gateway 232 employ distributed enterprise 5G service controller application specific interfaces (APIs) provided by an API engine 250 for (i) inter-network communication (e.g., between enterprise network 202 and SP network 204), (ii) intra-network communication (e.g., between SP service gateway 232 and SP SR controller 234, and between SP service gateway 232 and transport router 236), and (iii) programming of functions in the SP network to support/extend enterprise network services across the SP network. More specifically, enterprise controller 210 employs an enterprise controller-to-SP gateway (GW) API 252 (also labeled "DNA-C to SP API GW," in FIG. 2) to communicate with SP service gateway 232. SP service gateway 232 employs an API 254 (also labeled "SP API-GW") to communicate with API 252 of enterprise controller 210, an API 256 (also labeled "SP core API-GW") to communicate with SP SR controller 234, and an API 258 (also labeled "SP transport API-GW") to communicate with transport router 236. APIs 254, 256, and 258 communicate with each other. As indicated in FIG. 2, SP service gateway 232 may employ API 254 to configure/program provider edge router 240 and firewall 242 as an SP/enterprise (ENT) ("SP/ENT") demilitarized (network) zone (DMZ). Components/services/applications designated with the label "SP/ENT" in FIG. 2 indicates that those components/services/applications are extended across enterprise network 202 and SP network 204. SP service gateway 232 may employ API 256 to provision/program 5G slices on core network 244 to implement SP/ENT virtual sessions and SP/ENT virtualization. SP service gateway 232 may employ API 258 to configure/program transport router 236 with an SP/ENT slice virtual topology.

Embodiments presented herein create different network constructs and applications between control planes of enterprise network 202 and SP network 204 to satisfy enterprise network requirements to be imposed on traffic traversing SP data plane 231 of the SP network. The control planes include, for example, applications and protocols between network devices that determine paths in the data plane. At a high-level, the constructs and applications include the following:
 a. Network slice creation and enterprise use:
  i. Creates a network association between enterprise network 202 and SP network 204.
 b. User group to policy distribution from the enterprise network to the SP network:
  i. Performs management of profiles for enterprise user groups and mapping of the user groups to network services.
  ii. Maintains enterprise user group sessions in the SP network to carry and apply enterprise user group specific policy to traffic in the SP network.
  iii. Maintains enterprise user group sessions in the SP network for monitoring and billing of network usage by traffic.
 c. Mobile device identity distribution from the enterprise network to the SP network:
  i. Performs mobile device identity authentication between the enterprise network and the SP network.

The embodiments that implement the above-listed constructs and applications are presented in the context of 5G slicing and 5G slices by way of example, only. It is understood that the embodiments apply equally to other types of network slicing and network slices besides 5G slicing and 5G slices, such as network slicing and network slices defined according to standards other than the 5G standards. For example, the embodiments apply, generally, to network slicing and network slices that support communication services of particular connection types with specific ways of handling a data plane and a control plane for the services. Generally, the network slicing creates unique services customized for various use cases, and creates virtual networks for applications that require separate blends of performance, capacity, latency, security, reliability, and coverage, for example.

Each of the above-listed constructs and applications are described in series below. First, network slice creation and enterprise use is described with reference to FIGS. 3-5.

Figure 3:
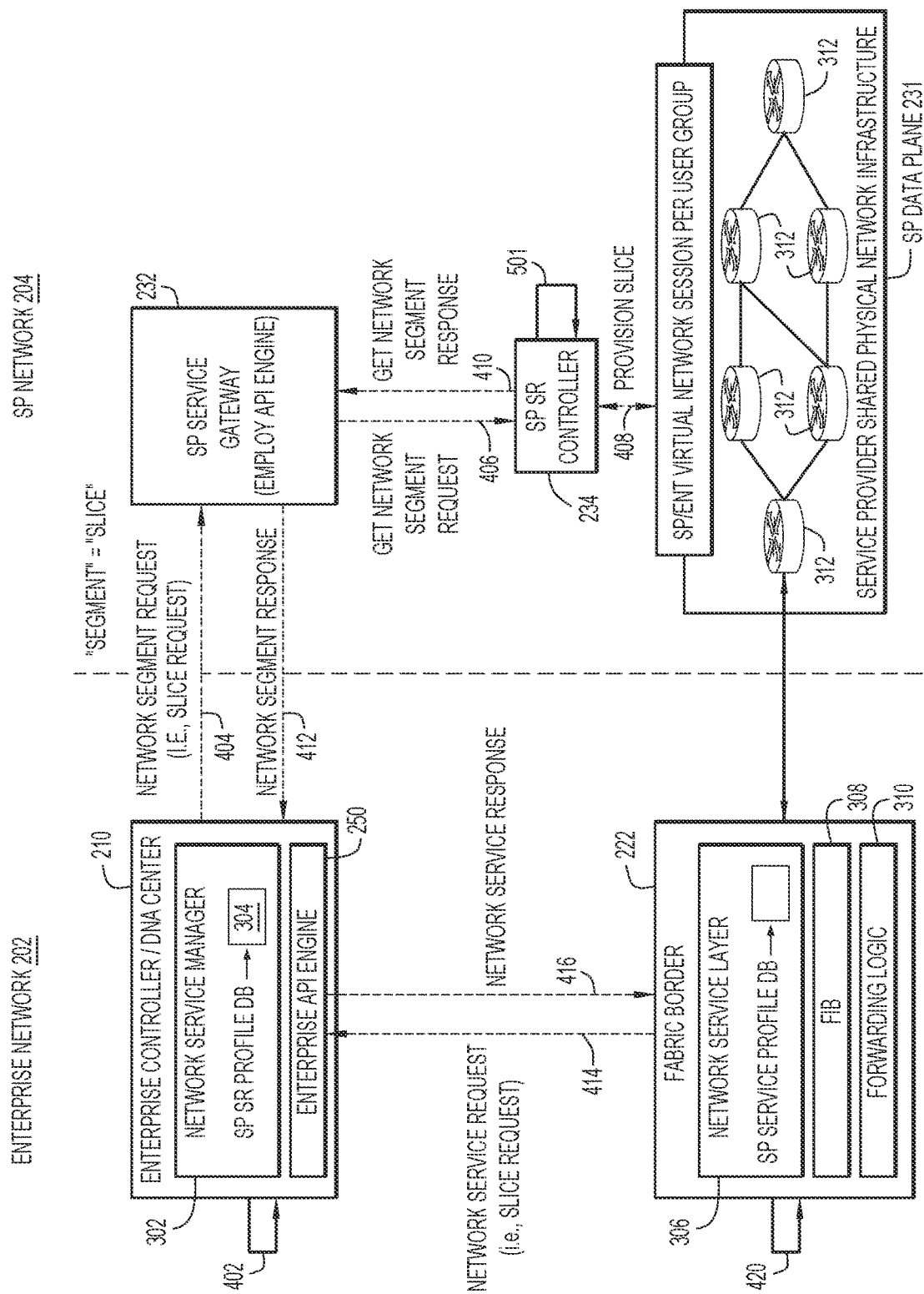
FIG. 3 is a block diagram that shows components of the enterprise network and the SP network, and various message exchanges between the components, employed to create 5G slices and to use the 5G slices between the enterprise network and the SP network, according to an example embodiment.

FIG. 3 is a block diagram that shows components of enterprise network 202 and SP network 204, and various messages exchanges between the components, employed to create 5G slices and use the 5G slices between the enterprise network and the SP network. FIG. 3 is also annotated to indicate various ones of operations of method 400 (i.e., 402-420) described below in connection with FIG. 4.

Enterprise controller 210 includes network service manager (NSM) 302 and an SP SR profile database (DB) 304 managed by the network service manager. Network service manager 302 may implemented as a virtual machine (VM) or Linux container (LXC). FB router 222 includes a network service layer 306 configured with an SR service profile database, a forwarding information base 308, and forwarding logic 310, which may be implemented in an application specific integrated circuit (ASIC), for example.

SP data plane 231 may include a physical network infrastructure of interconnected switches and routers 312 configured to implement segment routing for 5G slices under control of SP SR controller 234.

Figure 4:
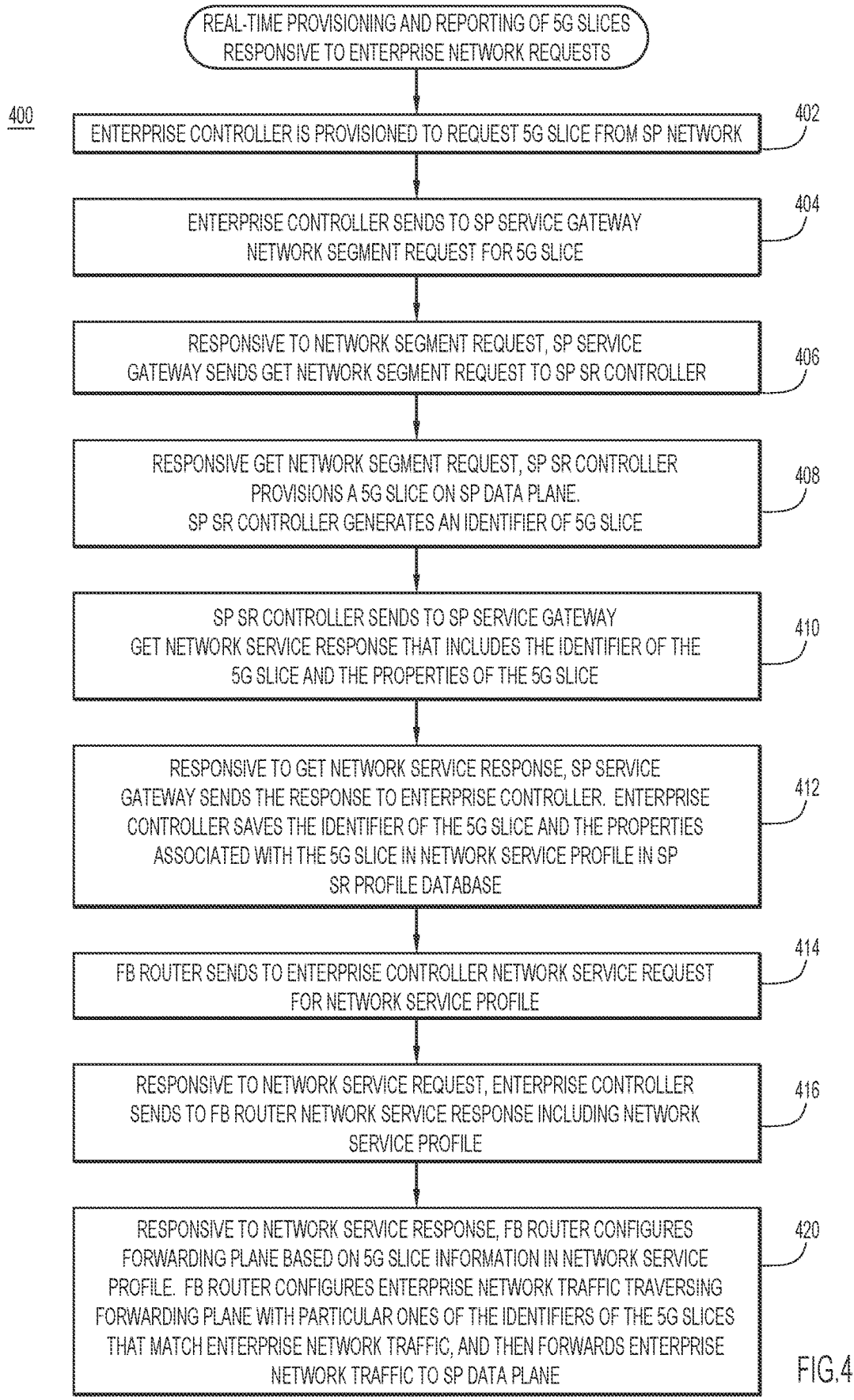
FIG. 4 shows operations directed to network slice creation and enterprise use performed by the components of FIG. 3, according to an example embodiment.

FIG. 4 shows example operations of a method 400 (also designated in FIG. 3) directed to network slice creation and enterprise use performed by the components shown in FIG. 3, according to an embodiment. FIG. 4 is now described with continued reference to FIG. 3. According to operations of method 400, SP network 204 provisions/creates 5G slices on SP data plane 231 in real-time responsive to requests for the 5G slices from/originated by enterprise controller 210, as described below.

At 402, in an a priori operation, enterprise controller 210 is provisioned to request a 5G slice from SP network 204.

At 404, enterprise controller 210 (e.g., NSM 302) sends to SP service gateway 232 a network segment request for a 5G slice. The request may specify properties for the 5G slice that satisfy/match enterprise network requirements for traffic.

At 406, SP service gateway 232 receives the network segment request and, responsive thereto, sends a get/create network segment request to SP SR controller 234. The get network segment request may also specify the properties of the 5G slice. Accordingly, at operations 402 and 404, enterprise controller 210 sends the network segment request to SP SR controller 234 through SP service gateway 232.

At 408, SP SR controller 234 receives the get network segment request and, responsive thereto, provisions on SP data plane 231 a 5G slice having the properties as specified in the get network segment request. SP SR controller 234 also generates an identifier of the 5G slice that is understood by the SP SR controller. The identifier represents an SR binding segment/slice identifier (ID) (BSID) or "token" that references the 5G slice, and binds the 5G slice to traffic in enterprise network 202 (see operation 420 described below) and to segment routing used for the 5G slice in SP data plane 231.

At 410, once SP SR controller 234 has provisioned the 5G slice on SP data plane 231, the SP SR controller generates, and sends to SP service gateway 232, a get network service response that includes the identifier of the 5G slice and the properties of the 5G slice.

At 412, SP service gateway 232 receives the get network segment response, and forwards the response to enterprise controller 210. Enterprise controller 210 saves the identifier of the 5G slice and the properties associated with the 5G slice in a network service profile in SP SR profile DB 304. Over time, multiple repetitions of operations 404 through 412 store information for multiple 5G slices in the network service profile, including identifiers of the multiple 5G slices and the properties of the 5G slices.

At 414, FB router 222 sends to enterprise controller 210 a network service request for the network service profile.

At 416, enterprise controller 210 receives from FB router 222 the network service request and, responsive thereto, sends to FB router 222 a network service response including the network service profile.

At 420, FB router 222 receives the network service response including the network service profile, and configures data plane 208 based on the 5G slice information in the network service profile. Specifically, FB router 222 configures traffic traversing data plane 208 with particular ones of the identifiers of the 5G slices that match the traffic. To configure the traffic, FB router 222 first determines the particular ones of the 5G slices that match the traffic based on a comparison of traffic policies (e.g., level of QoS) associated with the traffic, as defined in the enterprise network, and the properties associated with the 5G slices (e.g., low latency, high bandwidth, VNF service, and so on). In other words, FB router 222 maps the 5G slices to the traffic based on the properties of the 5G slices and the traffic policies. Then, FB router 222 applies the identifiers of the 5G slices to the traffic based on results of the determining/mapping. For example, FB router inserts the identifiers for the 5G slices into packet headers of IP packets in the traffic. FB router 222 then forwards the traffic configured with the identifiers to SP data plane 231.

Figure 5:
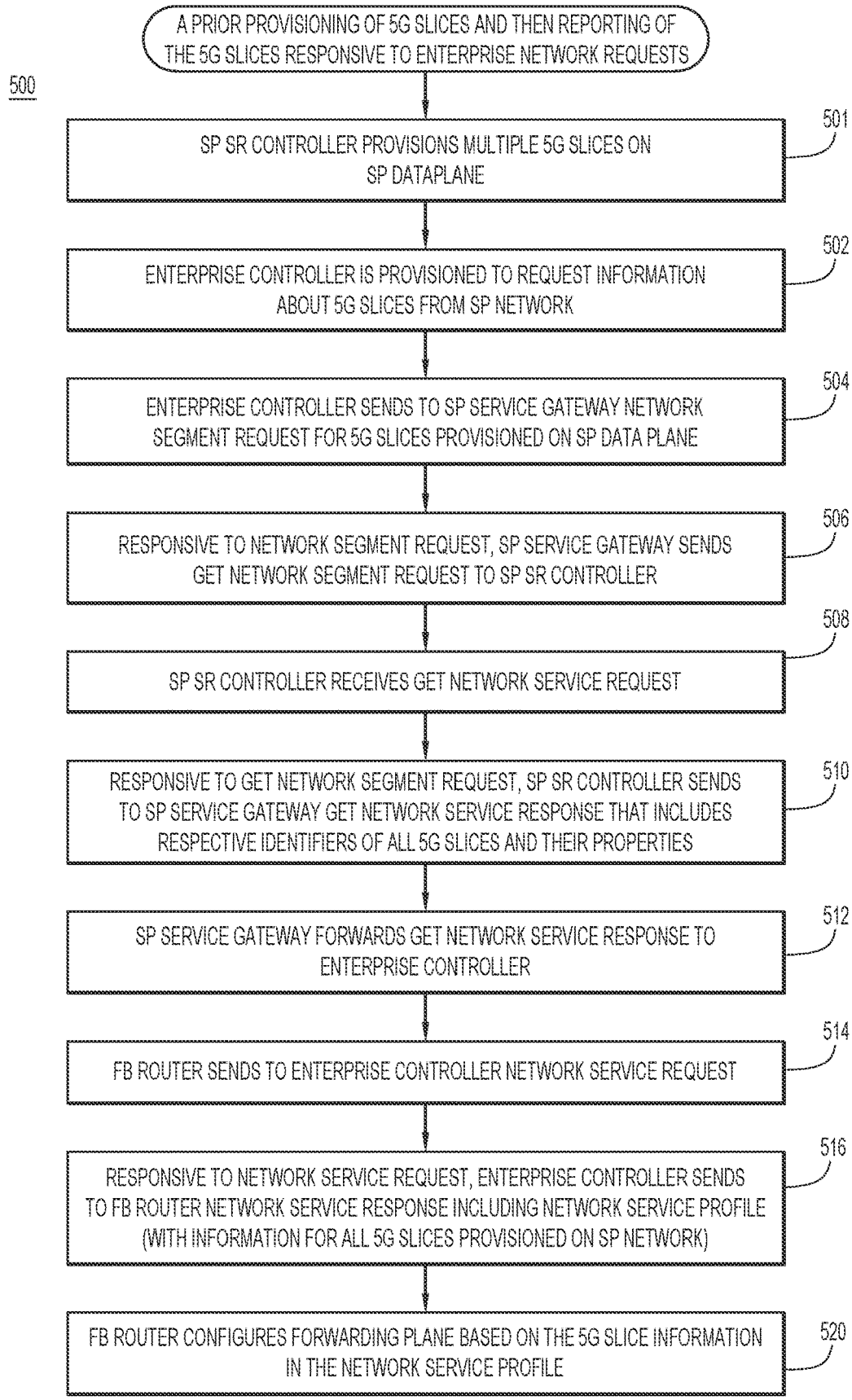
FIG. 5 shows operations directed to network slice creation and enterprise use performed by the components of FIG. 3, according to another embodiment.

With reference to FIG. 5, there are shown example operations of method 500 directed to network slice creation and enterprise use performed by the components shown in FIG. 3, according to another embodiment. Operations of method 500 are similar to operations of method 400, except that according to operations of method 500, SP network 204 provisions/creates 5G slices on SP data plane 231 in an a prior operation, and then returns information about the 5G slices to enterprise controller 210 responsive to a request for that information from the enterprise controller, as described below. Operations 502-520 correspond, more or less, with operations 402-420, respectively. FIG. 5 is now described also with continued reference to FIG. 3.

At 501, in an a priori operation, SP SR controller 234 provisions multiple 5G slices on SP data plane 231. The 5G slices have respective identifiers and properties associated with the 5G slices. In an example, the 5G slices may include a first slice configured to impose low latency on traffic, a second slice configured for high bandwidth traffic, a third slice configured to provide VNF service for traffic, and a fourth slice configured to provide high quality service for traffic. That is, the low latency, the high bandwidth, the VNF service, and the high quality service represent the respective properties of the first, second, third, and fourth 5G slices, respectively. The 5G slices have respective identifiers, i.e., 5G slice identifiers.

At 502, in an a priori operation, enterprise controller 210 is provisioned to request information about the 5G slices from SP network 204.

At 504, enterprise controller 210 sends to SP service gateway 232 a network segment request for the 5G slices provisioned on SP data plane 231, i.e., for information about the 5G slices.

At 506, SP service gateway 232 receives the network segment request and, responsive thereto, sends a get network segment request to SP SR controller 234.

At 508, SP SR controller 234 receives the get network segment request.

At 510, responsive to the get network segment request, SP SR controller 234 sends to SP service gateway 232, a get network service response that includes the respective identifiers of the 5G slices and their properties.

At 512, SP service gateway 232 receives the get network segment response (i.e., the information about the 5G slices that was previously requested), and forwards the response to enterprise controller 210. Enterprise controller 210 saves the respective identifiers of the 5G slices and their properties in the network service profile of SP SR profile DB 304.

At 514, FB router 222 sends to enterprise controller 210 a network service request for the network service profile.

At 516, enterprise controller 210 receives from FB router 222 the network service request and, responsive thereto, sends to FB router 222 a network service response including the network service profile.

At 520, FB router 222 receives the network service response including the network service profile, and configures data plane 208 based on the 5G slice information in the network service profile, as described above in connection with operation 420. FB router 222 may configure different types of traffic for the different types of 5G slices. For example, FB router 222 may configure (i) first QoS traffic (i.e., a first QoS traffic flow) with a first identifier of a 5G slice that matches the first QoS traffic, (ii) second QoS traffic with a second identifier of a 5G slice that matches the second QoS traffic, and so on.

User group to policy distribution from enterprise network 202 to SP network 204 is now described with reference to FIGS. 6 and 7.

Figure 6:
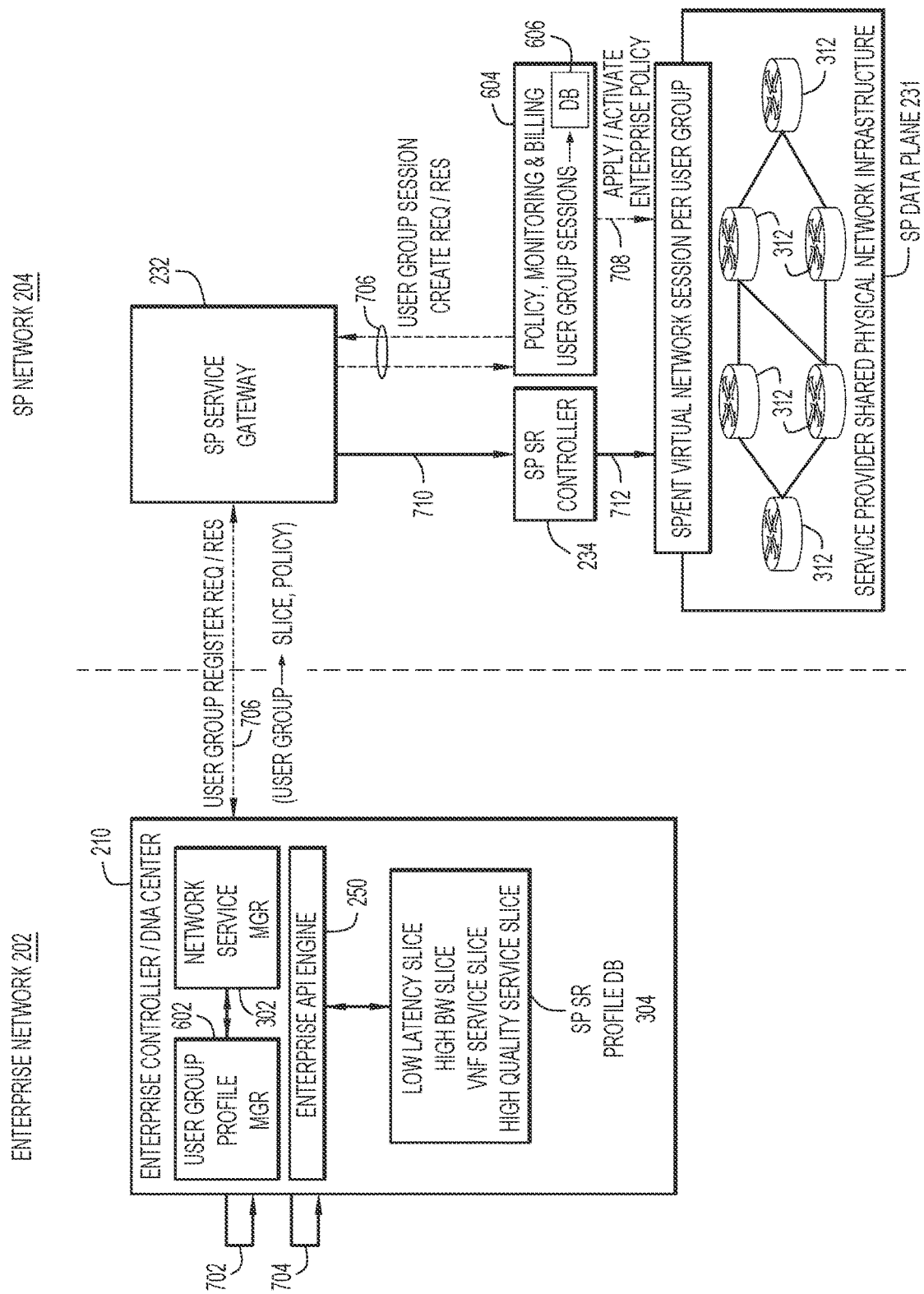
FIG. 6 is a block diagram that shows components of the enterprise network and the SP network, and various message exchanges between the components, employed to implement user group to policy distribution from the enterprise network to the SP network, according to an example embodiment.

FIG. 6 is a block diagram that shows components of enterprise network 202 and SP network 204, and various message exchanges between the components, employed to implement user group to policy distribution from enterprise network 202 to SP network 204. FIG. 6 is also annotated with indicators of various ones of operations of method 700 (i.e., 702-708) described below in connection with FIG. 7.

As shown in FIG. 6, enterprise controller 210 includes user group profile manager (UGPM) 602 (also referred to as a "policy and assurance manager") in addition to network service manager 302 and an SP SR profile DB 304, described above. User group profile manager 602 is primarily responsible for user group to policy distribution, as described below. Also, SP network 204 includes a policy, monitoring, and billing manager 604 to map user group sessions to 5G slices and store resulting mappings in a local database 606.

Figure 7:
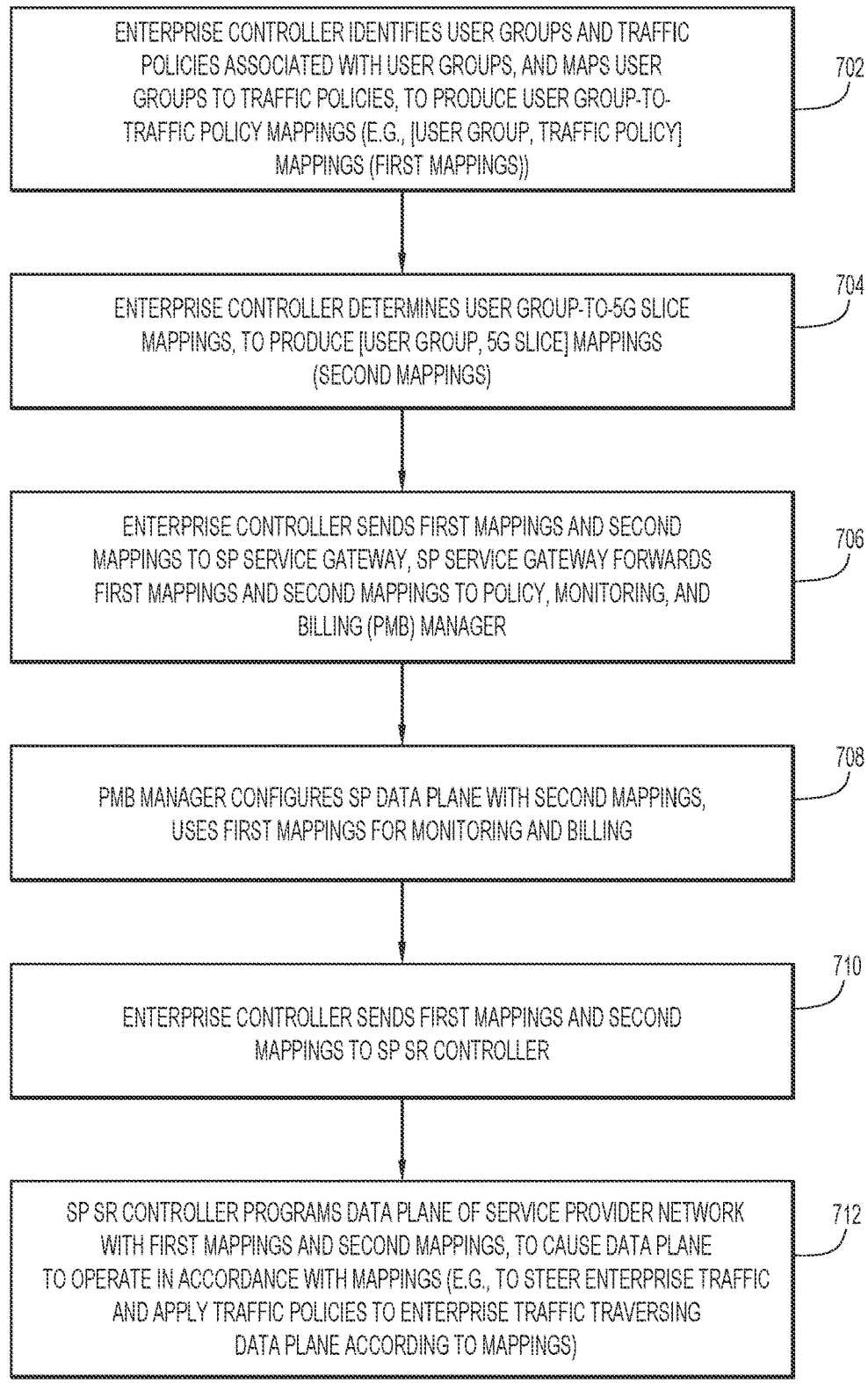
FIG. 7 shows example operations directed to user group to policy distribution from the enterprise network to the SP network performed by the components of FIG. 6, according to an example embodiment.

With reference to FIG. 7, there are shown example operations of method 700 (also indicated in FIG. 6) directed to user group to policy distribution from enterprise network 202 to SP network 204 performed by the components shown in FIG. 6, according to an embodiment. Operations of method 700 assume that SP SR profile DB 304 stores information about 5G slices provisioned on SP network 204. Such information may include first, second, third, and fourth 5G slice identifiers for latency, bandwidth, VNF service, and quality slices, acquired from operations 502-512 described above. FIG. 7 is now described with continued reference to FIG. 6.

At 702, enterprise controller 210 (e.g., UGPM 602) identifies enterprise network user groups for groups users in enterprise network 202, and traffic policies associated with the user groups. The traffic policies are to be applied traffic associated with the user groups. The user groups and the traffic policies may be provisioned on/defined by enterprise network 202 and stored in an enterprise network database accessible to UGPM 602. The user groups are identified by respective user group identifiers, e.g., security group tags (SGTs), and may be linked to respective ones of the traffic policies via respective identifiers of the traffic policies. Enterprise controller 210 determines user group-to-traffic policy mappings of the user groups to the respective traffic polices associated with the user groups, and stores the user group-to-traffic policy mappings locally. In other words, enterprise controller 210 maps the user groups to the traffic policies associated with the user groups. The user group-to-traffic policy mappings may take the form of tuples [user group, traffic policy], for example. In this way enterprise controller 210 binds/associates the user groups to/with their associated traffic policies.

At 704, enterprise controller 210 determines user group-to-5G slice mappings of (i.e., maps) the user groups to those 5G slices that match the user groups based on the traffic policies associated with the user groups and the properties of the 5G slices. The user group-to-5G slice mappings may take the form of (identifier) tuples [user group, 5G slice], for example. To perform the mapping, enterprise controller 210 may compare the properties of the 5G slices provisioned on SP network 204, as stored in SP SR profile DB 304, to the traffic policies, and then perform the mapping based on results of the compare. For example, a low latency 5G slice would be deemed a match to a traffic policy that requires low latency, as indicated in a QoS value, and so on.

At 706, enterprise controller 210 sends to SP service gateway 232 a user group register request that includes the user group-to-traffic policy mappings (i.e., first mappings [user group, traffic policy]) and the user group-to-5G slice mappings (i.e., second mappings [user group, 5G slice]). In response, SP service gateway 232 forwards to policy, monitoring, and billing (PMB) manager 604 a user group session create request accompanying the user group-to-traffic policy mappings (i.e., first mappings) and the user group-to-5G slice mappings (i.e., second mappings).

At 708, in response to receiving the mappings from SP service gateway 232 sent at 706, PMB manager 604 stores the mappings in local database 606, and configures/programs the associations indicated by the second mappings [user group, 5G slice] into SP data plane 231, to ensure traffic traversing SP network 204 experiences end-to-end consistent network characteristics and performance. PMB manager 604 also uses the first mappings [user group, traffic policy] to establish enterprise user group sessions that monitor the traffic (e.g., traffic usage) traversing SP network 204 and apply billing services to the traffic consistent with the user group and traffic policy associations, e.g., based on the first mappings. PMB manager 604 also sends a user group session response to enterprise controller 210 through SP service gateway 232.

At 710, SP service gateway 232 sends to SP SR controller 234 the user group-to-traffic policy mappings (i.e., first mappings [user group, traffic policy]) and the user group-to-5G slice mappings (i.e., second mappings [user group, 5G slice]). In response, at 712, SP SR controller 234 programs/configures network devices of data plane 231 with information from the first and second mappings to enable/cause the data plane to handle traffic from enterprise network 202 according to the mappings. For example, SP service gateway 232 may program a provider edge router in data plane 231 (see, e.g., provider edge router PE1 of FIG. 11, described below) with the first mappings and the second mappings, so that the provider edge is able to (i) examine traffic from enterprise network 202 for various indicators configured in the traffic by the enterprise network, e.g., for identifiers of user groups (e.g., SGTs) and identifiers of 5G slices, and (ii) apply to the traffic the traffic policies that correspond to the identifiers of the user groups found in the traffic according to the first mappings, (ii) and steer the traffic to the 5G slices that correspond to the identifiers of the 5G slices found in the traffic.

Thus, in operations 700, enterprise controller 210 sends to the first mappings and the second mappings to control functions (e.g., SP SR controller 234 and PMB manager 604) of service provider network 204 through/via SP service gateway 232. The control functions are responsible for controlling and monitoring the network traffic (from enterprise network 202) traversing data plane 208 of service provider network 204. The control functions perform the controlling and monitoring based on the first mappings and the second mappings, i.e., the first mappings and the second mappings cause the control functions to perform the controlling and monitoring according to the first mappings and the second mappings.

Mobile device (MD) identity distribution from enterprise network 202 to SP network 204 is now described with reference to FIGS. 8 and 9.

Figure 8:
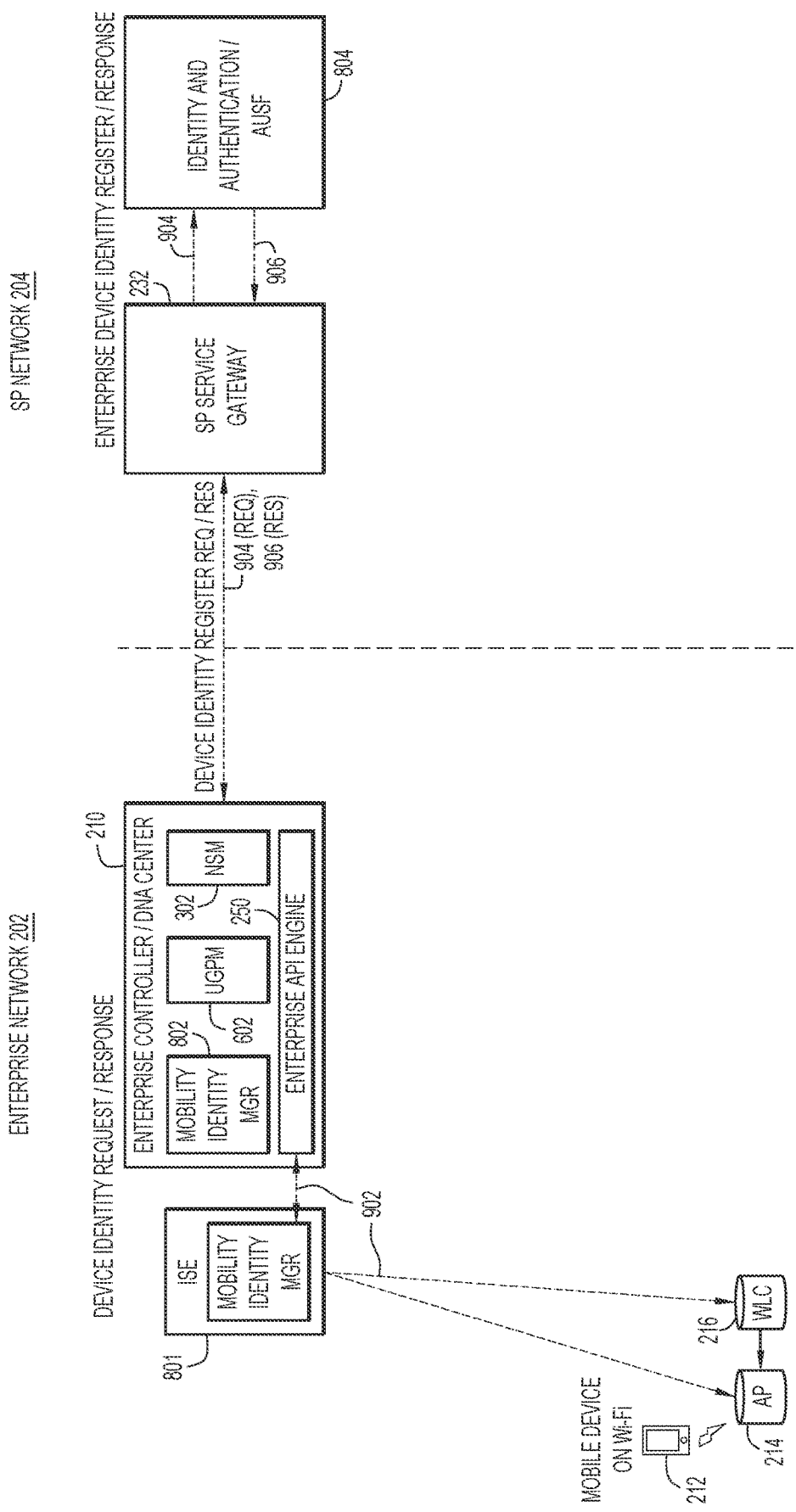
FIG. 8 is a block diagram that shows components of the enterprise network and the SP network, and various message exchanges between the components, employed to implement mobile device identity distribution from the enterprise network to the SP network, according to an example embodiment.

FIG. 8 is a block diagram that shows components of enterprise network 202 and SP network 204, and various message exchanges between the components, employed to implement mobile device identity distribution from enterprise network 202 to SP network 204. FIG. 8 is also annotated to indicate various ones of operations 900 (i.e., 902-906) described below in connection with FIG. 9. As shown in FIG. 8, enterprise network 202 includes an identity services engine (ISE) 801 configured with a mobility identity manager (also referred to as a "mobility identity register") that acquires mobile device identities from mobile devices, e.g., mobile device 212, and registers the mobile device identities locally. Enterprise controller 210 includes a mobility identity manager 802, peered with the mobility identity manager of ISE 801, in addition to other components described above. Mobility identity manager 802 maintains respective user mobile device identities for mobile devices and also respective SP contexts associated with the mobile device identities. Also, SP network 204 includes an identity-and-authentication service function/server (AUSF) (identity-and-AUSF) 804 to perform authentication of mobile devices and to register the mobile devices in SP network 204.

Figure 9:
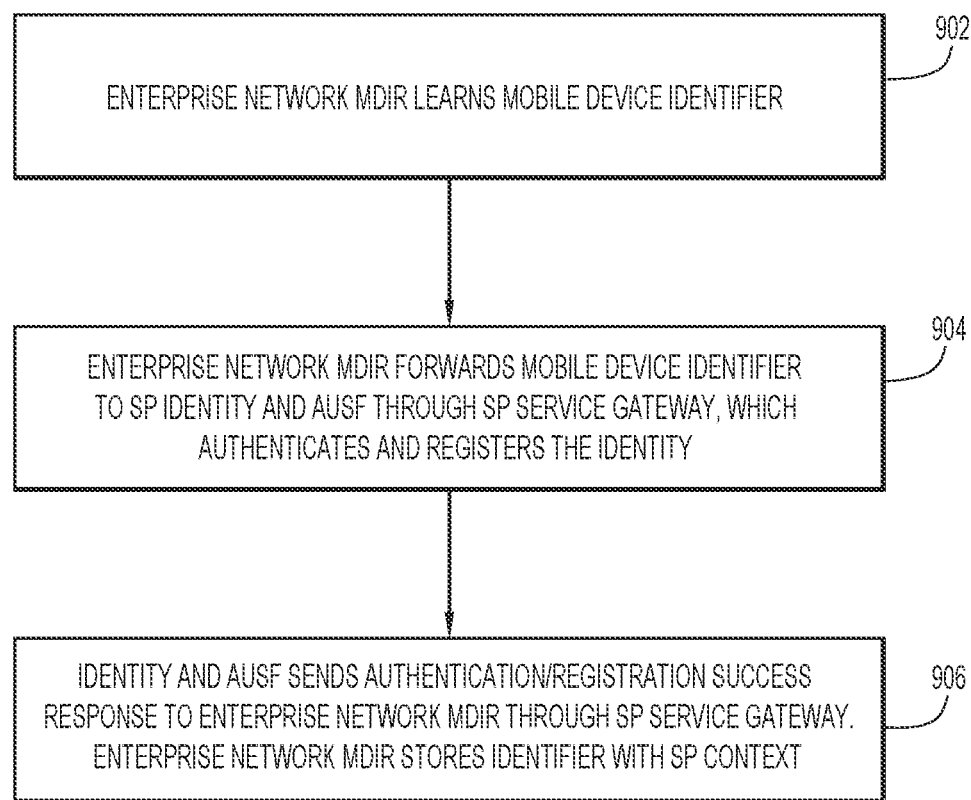
FIG. 9 shows operations directed to mobile device identity distribution from the enterprise network to the SP network performed by the components of FIG. 8, according to an example embodiment.

With reference to FIG. 9, there are shown example operations 900 (also indicated in FIG. 8) directed to mobile device identity distribution from enterprise network 202 to SP network 204 performed by the components shown in FIG. 8. FIG. 9 is described with continued reference to FIG. 8.

At 902, the mobile identity manager of ISE 801 learns a mobile device identity of mobile device 212 at the location of enterprise network 202, registers the mobile device identity in the enterprise network, and passes the mobile device identity to symmetric/peer mobility identity manager 802 of enterprise controller 210. The mobile device identity is a unique identifier of the mobile device.

At 904, enterprise controller 210 (e.g., mobility identity manager 802) receives the mobile device identity. Enterprise controller 210 forwards to identity-and-AUSF 804, through SP service gateway 232, a device identity register request including the mobile device identity. Responsive to the request, identity-and-AUSF 804 authenticates mobile device 212 based on its mobile device identity, and registers the mobile device in SP network 204.

At 906, once the mobile device identity is registered in SP network 904, identity-and-AUSF 804 sends to mobility identity manger 802, through SP service gateway 232, a device identity register response indicating the mobile device identity was authenticated successfully and registered in SP network 204. Mobility identity manager 802 stores/maintains locally the authenticated, registered device identity linked to an SP context associated with the identity, e.g., the indication that the identity was successfully authenticated.

Figure 10:
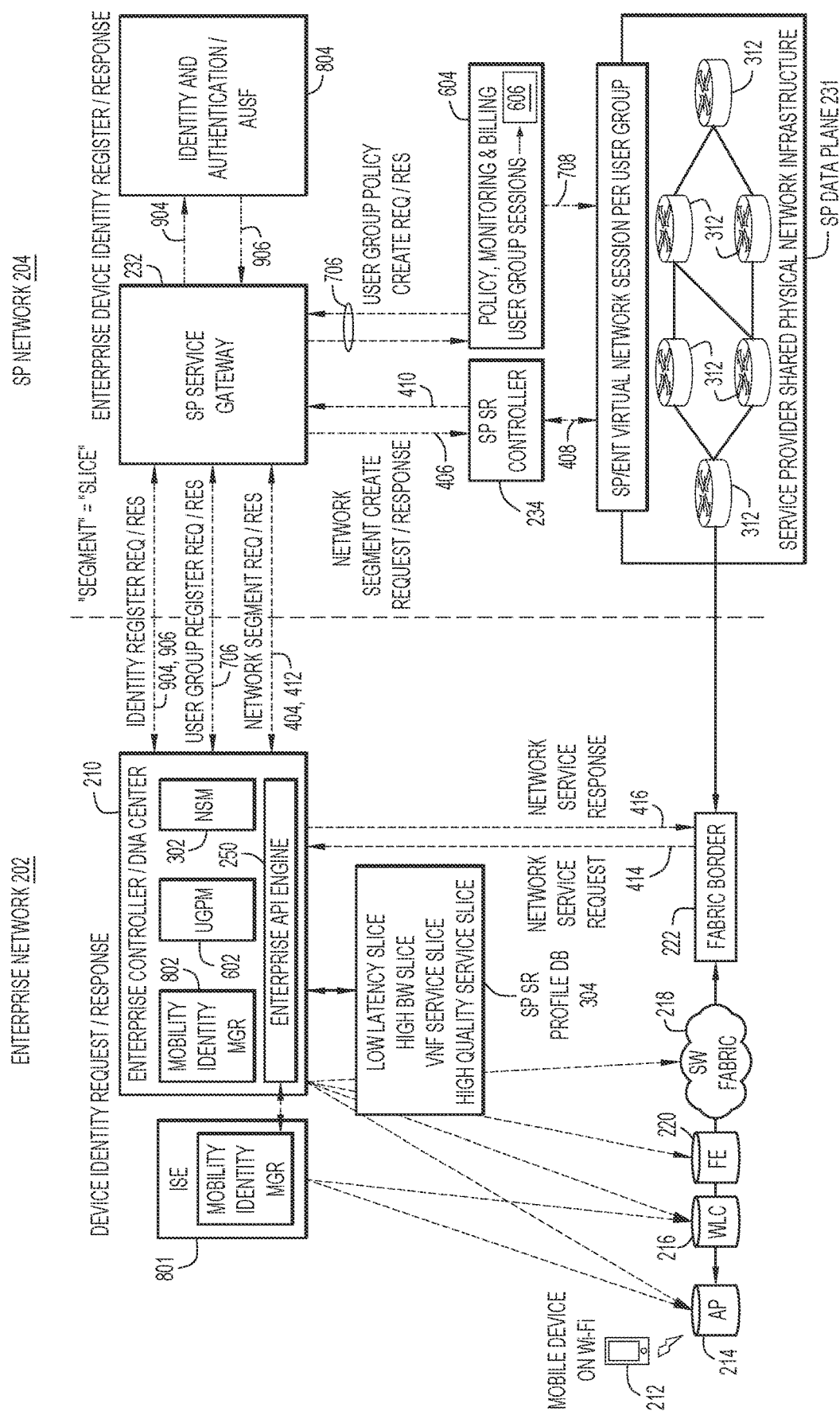
FIG. 10 is a block diagram of the enterprise network and the SP network that shows a combination of the components and the message transactions shown in FIGS. 3-9, according to an example embodiment.

With reference to FIG. 10, there is a block diagram of enterprise network 202 and SP network 204 that shows a combination of components and message transactions described above in connection with FIGS. 3-9. In other words, FIG. 10 shows components and message transactions of enterprise network 202 and SP network 204 employed to implement (i) network slice creation and enterprise use, (ii) user group to traffic policy distribution from the enterprise network to the SP network, and (iii) mobile device identity distribution from the enterprise network to the SP network.

Figure 11:
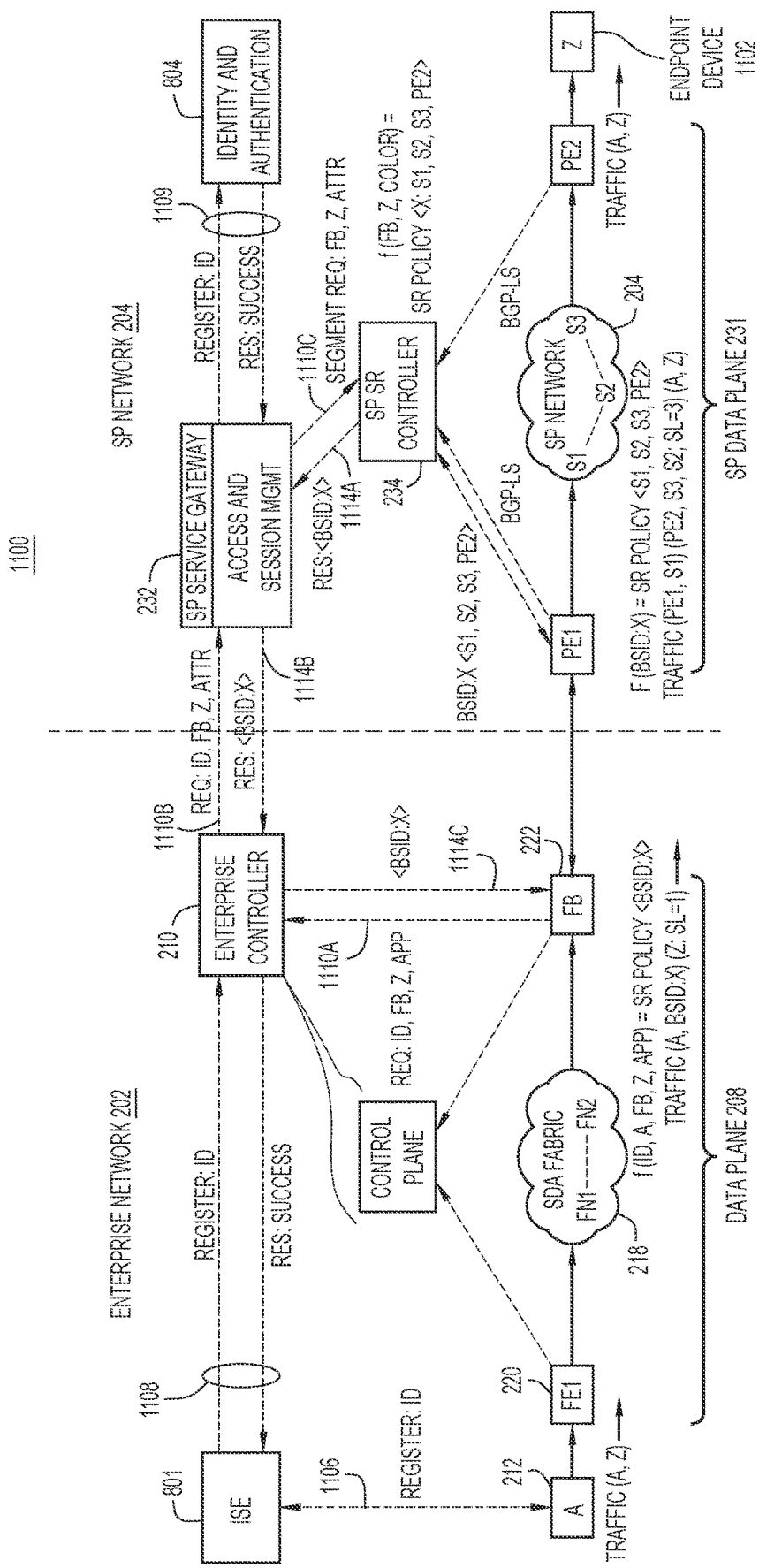
FIG. 11 is a diagram of detailed message flows or transactions between the enterprise network and the SP network, according to an example embodiment.

FIG. 11 is a diagram of detailed message flows or transactions 1100 (collectively referred to as transactions 1100) between enterprise network 202 and the SP network 204. Transactions 1100 include various ones of the messages/transactions described above, primarily in connection with the real-time provisioning and reporting of 5G slices of method 400 of FIG. 4, with further details added to the messages/transactions. In FIG. 11, mobile device 212 has a source IP address A, and a device identity ID, and originates traffic destined for an endpoint device (i.e., "endpoint") 1102 (shown at the lower right-hand side of FIG. 12) having a destination IP address Z. FB router 222 has an IP address designated as FB. FE 220 of data plane 208 is also designated FE1. Also, SP data plane 231 includes a provider edge (PE) router PE1, a physical "SP network" 1106 corresponding to components 242 and/or 244 of FIG. 2, and a provider edge router PE2 to communicate with endpoint 1102. SP network 204 includes a segment route comprising network devices S1, S2, and S3 configured to implement a provisioned 5G slice having an identifier X, referred to in FIG. 11 as a binding segment ID (BSID) X.

Transactions 1106, 1108, and 1109 implement mobile device identity distribution from enterprise network 202 to SP network 204, as described above in connection with FIGS. 8 and 9. In transactions 1106, 1108, and 1109, "register: ID" represents the device identity register request described above, and "res" represents the device identity response described above. The request and response include the mobile device identity ID.

Transaction 1110A, 1110B, and 1110C collectively represent a 5G slice request from FB router 222 to SP SR controller 234 that includes mobile device identity ID, source IP address FB, destination IP address Z, and an App designator. In an example, the App designator may include a QoS value for traffic to be handled by the requested 5G slice. The App designator may be translated to an attribute designator Attr at enterprise controller 210. Transactions 1110A, 1110B, and 1110C correspond generally to transactions 414, 404, and 410 described above, but in a permuted order.

Responsive to the 5G slice request, SP SR controller 234 performs function f (FB, Z, "Color"), which returns SR Policy (i.e., list of segment identifiers to visit) <BSID=X: S1, S2, S3, PE2>, in which S1 is the first segment identifier to visit, S2 is the second segment identifier to visit, and S3 is the last segment identifier to visit. The designator "Color" represents a transformation of the attribute Attr, which represents the designator App. In other words, the designator Color maps back to the QoS value to be supported by the 5G slice. The function determines/establishes the segment routing policy <X: S1, S2, S3> for the 5G slice. SP SR controller 234 configures the 5G slice having identifier BSID=X with segment route S1, S2, S3, exiting at PE2 on SP data plane 231, to implement the required segment routing policy translated from App. The configured routing may include, for example, Border Gateway Protocol (BGP) Link State (LS) (BGP-LS). SP SR controller 234 configures provider edge router PE1 with 5G slice identifier BSID=X and forwarding information to enable/cause PE1 to forward traffic to segment route S1, S2, S3. Also, using transactions 1114A, 1114B, and 1114C, which correspond generally to transactions 410, 412, and 416 described above, SP SR controller 234 forwards to fabric border router 222 a response to the 5G slice request. The response includes information for the 5G slice, such as identifier BSID=X and properties associated with the 5G slice.

Responsive to receiving the 5G slice response including BSID=X, FB router 222 configures data plane 208 with BSID=X. To do this, FB router 222 applies the following function to traffic traversing data plane 208:

f (ID, A, FB, Z, App), which returns SR (BSID:X), where the control variables A, FB, Z, and App may be accessed from headers of IP packets in the traffic, and ID may be accessed from enterprise controller 210.

The function returns BSID=X (i.e., the identifier of the 5G slice provisioned on SP data plane 231) responsive to the control variables ID, A, FB, Z, and App (e.g., QoS value) in the traffic. The function matches App (e.g., QoS value) in the traffic to the properties of the 5G slice.

Armed with the identifier X of the 5G slice, FB router 222 configures traffic according to the following rule: Traffic (A, BSID:X) (Z; Segments Left (SL)=1). In other words, FB router 222 inserts BSID=X into packet headers of IP packets having source IP address A, and destined for endpoint Z. FB router 222 then forwards the configured traffic to SP network 204.

Provider edge router PE1 receives the configured traffic from FB router 222, and applies the following function to the traffic:

f (BSID:X), which returns SR Policy <S1, S2, S3, PE2>.

In other words, the provider edge router PE1 accesses the BSID (which has value X) from the packet headers of the traffic, and plugs the BSID into the function. In this case, BSID=X is mapped to segment router S1, S2, S3, exiting at PE2. Accordingly, provider edge router PE1 steers the traffic to the segment route for the 5G slice with BSID=X, based on the BSID, according to the rule:

Traffic (PE1, S1)(PE2, S3, S2; SL=3) (A, Z)–>.

In other words, traffic with source IP address A and destination IP address Z is routed from PE1 to next hop S1; from there, the traffic reaches PE2 via S2 and S3.

While the transactions of FIG. 11 correspond primarily to the real-time provisioning and reporting of 5G slices of method 400, by way of example, slight modifications to the transactions may be made to implement the a priori provisioning of 5G slices and then reporting of the 5G slices as described above in connection with method 500 of FIG. 5. For example, SP SR controller 234 configures multiple 5G slices on SP data plane 231 in an a prior operation, that preserves multiple corresponding identifiers BSIDs, one per 5G slice, as described above. Then, responsive to a request "REQ" originated from FB router 222, and forwarded to SP SR controller 234, the SP SR controller returns the identifiers BSIDs of the pre-provisioned 5G slices to the FB router, which applies the BSIDs to corresponding traffic flows destined from the 5G slices.

With reference to FIG. 12, there is a block diagram of an example network device 1200 representative of a router or a switch (e.g., any of the routers and switches in enterprise network 202 and SP network 204), for example. Network device 1200 comprises a network interface unit having a plurality of network input/output (I/O) ports 1242(1)-1242 (M) to send traffic to and receive traffic from a network, and to forward traffic in the network, a packet forwarding/processing unit 1243, a network processor 1244 (also referred to simply as "processor"), and a memory 1246. The packet forwarding/processing unit 1243 is, for example, one or more application specific integrated circuits (ASICs) that include packet buffers, packet queues, and other control logic for performing packet forwarding operations. The processor 1244 may include multiple processors, which may be implemented as software or hardware processors. For example, processor 1244 may include a microcontroller or microprocessor that is configured to perform higher level controls of network device 1200. To this end, the memory 1246 stores software instructions that, when executed by the processor 1244, cause the processor 1244 to perform a variety of operations including operations described herein. For example, the memory 1246 stores instructions for control logic 1250 to perform operations described herein. Control logic 1250 may also include logic components in packet forwarding unit 1243.

Memory 1246 also stores data 1260 used and generated by logic 1250, including packet loss information, for example.

With reference to FIG. 13, there is a block diagram of an example computer device 1300 representative of controller devices (i.e., controllers) or service gateways in enterprise network 202 and SP network 204, such as enterprise controller 210, SP service gateway 232, SP SR controller 234, identity-and-AUSF 408, PMB manager 604, and so on. More generally, computer device 1300 may host control application and APIs, such as API engine 250. Computer device 1300 includes network interface unit 1305 to communicate with a wired and/or wireless communication network, and to control network devices over the network. Computer device 1300 also includes a processor 1354 (or multiple processors, which may be implemented as software or hardware processors), and memory 1356. Network interface unit 1305 may include an Ethernet card with a port (or multiple such devices) to communicate over wired Ethernet links and/or a wireless communication card with a wireless transceiver to communicate over wireless links.

Memory 1356 stores instructions for implementing methods described herein. Memory 1356 may include read only memory (ROM), random access memory (RAM), magnetic disk storage media devices, optical storage media devices, flash memory devices, electrical, optical, or other physical/tangible (non-transitory) memory storage devices. The processor 1354 is, for example, a microprocessor or a microcontroller that executes instructions stored in memory. Thus, in general, the memory 1356 may comprise one or more tangible computer readable storage media (e.g., a memory device) encoded with software comprising computer executable instructions and when the software is executed (by the processor 1354) it is operable to perform the operations described herein. For example, memory 1356 stores control logic 1358 to perform operations for controllers as described herein.

The memory 1356 may also store data 1360 used and generated by logic 1358.

Figure 14:
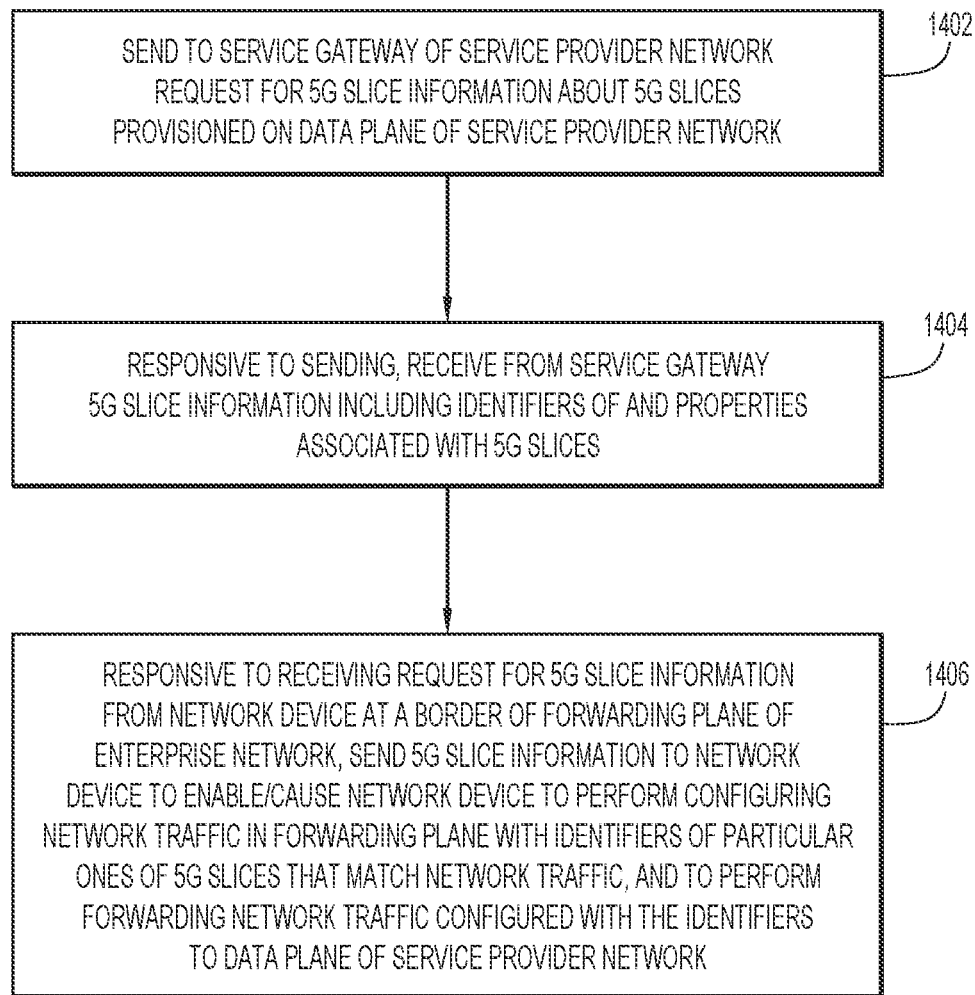
FIG. 14 is a flowchart of a method performed primarily by enterprise controller, according to an example embodiment.

With reference to FIG. 14, there is a flowchart of an example method 1400 performed primarily by enterprise controller 210. Method 1400 includes operations described above.

At 1402, enterprise controller 210 sends to service gateway 232 of service provider network 204 a request for 5G slice information about 5G slices provisioned on data plane 231 of the service provider network.

At 1404, responsive to the sending, enterprise controller 210 receives, from service gateway 232 the 5G slice information including identifiers of and properties associated with the 5G slices.

At 1406, responsive to receiving a request for the 5G slice information from a network device (e.g., FB router 222) at a border of forwarding plane 208 of enterprise network 202, enterprise controller 210 sends the 5G slice information to the network device to cause the network device to perform configuring network traffic in forwarding plane 208 with the identifiers of particular ones of the 5G slices that match the network traffic, and to perform forwarding the network traffic configured with the identifiers to data plane 231 of service provider network 204.

Figure 15:
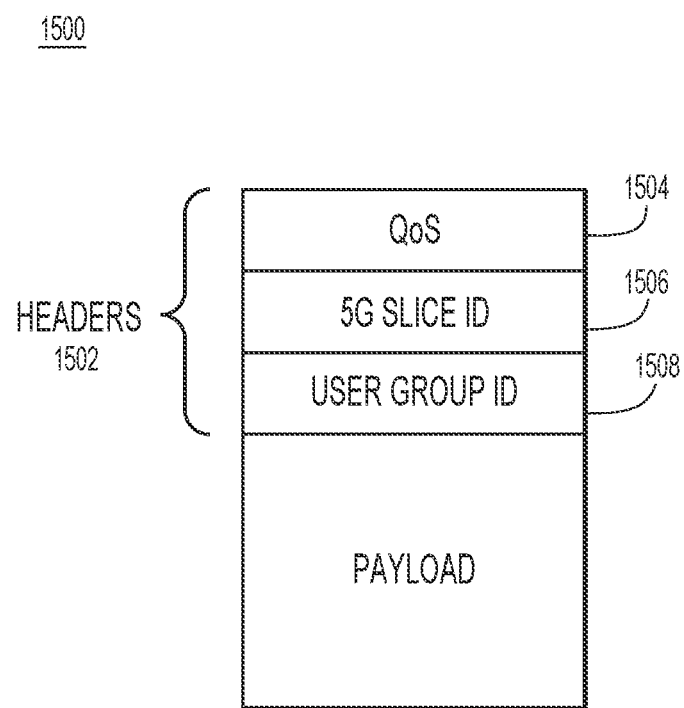
FIG. 15 is an illustration of an Internet Protocol (IP) packet forwarded from a forwarding plane of the enterprise network after an enterprise controller of the enterprise network has configured the IP packet, according to an example embodiment.

With reference to FIG. 15, there is an illustration of an example IP packet 1500 of traffic forwarded from forwarding plane 208 to SP data plane 231, after enterprise controller 210 has configured the IP packet according to embodiments presented herein. IP packet 1500 includes one or more headers 1502. The one or more headers include a QoS value 1504, an identifier 1506 of a 5G slice (i.e., a 5G slice identifier (ID) 1506), and an identifier 1508 of a user group (i.e., a user group ID 1508, which may be an SGT).

In summary, conventionally, in an enterprise network, enterprise segmentation and transport services are limited to an enterprise overlay. Extending those services end-to-end across the enterprise network and software defined (SD) WAN (SDWAN) is critical to the enterprise network for service assurance, and to a service provider for differentiation of their network offerings. To overcome the above-mentioned limitation, embodiments presented herein extend the enterprise segmentation and transport services from the enterprise network into a service provider network through automation of provisioning 5G slices by the enterprise network, and define an implementation in a segment routing underlay for 5G slices. Thus, the embodiments combine the provisioning and deployment of enterprise segmentation policy, service layer agreement (SLA), and 5G slices across the heterogeneous enterprise and SP networks, end-to-end. This extends enterprise network service provisioning to the SP network, for consistent quality of experience, regardless of access method (SP 5G or enterprise access). The embodiments provide a process for automating provisioning of SP 5G slices using an SR underlay, a process for distribution of user group association to policy and network slice, and a process for distribution of endpoint device identity between the enterprise network and the SP network to map identity to group policy to provide consistent quality of experience.

In summary, in one form, a method is provided comprising: by an enterprise controller of an enterprise network: sending to a service gateway of a service provider network a request for network slice information about network slices provisioned on a data plane of the service provider network; responsive to the sending, receiving, from the service gateway the network slice information including identifiers of the network slices and properties associated with the network slices; and responsive to receiving a request for the network slice information from a network device at a border of a forwarding plane of the enterprise network, sending the network slice information to the network device to cause the network device to perform configuring network traffic in the forwarding plane with identifiers of ones of the network slices that match the network traffic, and to perform forwarding the network traffic configured with the identifiers of the ones of the network slices to the data plane of the service provider network.

In another form, an apparatus is provided comprising: a network interface unit; and a processor of an enterprise controller of an enterprise network coupled to the network interface unit and configured to perform: sending to a service gateway of a service provider network a request for network slice information about network slices provisioned on a data plane of the service provider network; responsive to the sending, receiving, from the service gateway the network slice information including identifiers of the network slices and properties associated with the network slices; and responsive to receiving a request for the network slice information from a network device at a border of a forwarding plane of the enterprise network, sending the network slice information to the network device to cause the network device to perform configuring network traffic in the forwarding plane with identifiers of ones of the network slices that match the network traffic, and to perform forwarding the network traffic configured with the identifiers of the ones of the network slices to the data plane of the service provider network.

In a further form, a non-transitory computer readable storage medium is provided. The One or more non-transitory computer readable media are encoded with instructions that, when executed by one or more processors, cause the one or more processors to perform, by an enterprise controller of an enterprise network: sending to a service gateway of a service provider network a request for network slice information about network slices provisioned on a data plane of the service provider network; responsive to the sending, receiving, from the service gateway the network slice information including identifiers of the network slices and properties associated with the network slices; and responsive to receiving a request for the network slice information from a network device at a border of a forwarding plane of the enterprise network, sending the network slice information to the network device to cause the network device to perform configuring network traffic in the forwarding plane with identifiers of ones of the network slices that match the network traffic, and to perform forwarding the network traffic configured with the identifiers of the ones of the network slices to the data plane of the service provider network.

In yet another form, a system is provided comprising: a network device at a border of a forwarding plane of an enterprise network; and an enterprise controller of the enterprise network and configured to perform: sending to a service gateway of a service provider network a request for network slice information about network slices provisioned on a data plane of the service provider network; responsive to the sending, receiving, from the service gateway the network slice information including identifiers of the network slices and properties associated with the network slices; and responsive to receiving a request for the network slice information from the network device, sending the network slice information to the network device; wherein the network device is configured to perform: responsive to the network slice information, configuring network traffic in the forwarding plane with identifiers of ones of the network slices that match the network traffic; and forwarding the network traffic configured with the identifiers of the ones of the network slices to the data plane of the service provider network.

Although the techniques are illustrated and described herein as embodied in one or more specific examples, it is nevertheless not intended to be limited to the details shown, since various modifications and structural changes may be made within the scope and range of equivalents of the claim.

What is claimed is:

1. A method comprising:
    by an enterprise controller of an enterprise network:
    sending to a service gateway of a service provider network a request for network slice information about network slices provisioned on a data plane of the service provider network;
    maintaining first mappings of user groups for network traffic of the enterprise network to traffic policies to be applied to the network traffic;
    determining second mappings of the user groups to ones of the network slices that match the user groups based on the traffic policies and properties associated with the network slices;
    responsive to the sending, receiving, from the service gateway, the network slice information including identifiers of the network slices and their properties; and
    responsive to receiving a request for the network slice information from a network device at a border of a forwarding plane of the enterprise network, sending the network slice information and the second mappings to the network device to cause the network device to perform configuring the network traffic in the forwarding plane with identifiers of ones of the network slices that match the network traffic based on the second mappings, and to perform forwarding the network traffic configured with the identifiers of the ones of the network slices to the data plane of the service provider network.

2. The method of claim 1, wherein the network slices are 3$^{rd}$ Generation Partnership Project (3GPP) 5G slices, and the network slice information includes 5G slice information, such that the identifiers of the network slices include identifiers of the 5G slices and the properties include properties of the 5G slices.

3. The method of claim 1, wherein, at the network device, the configuring the network traffic includes:
    determining the ones of the network slices that match the network traffic based on the traffic policies associated with the network traffic as defined in the enterprise network and the properties associated with the network slices; and
    applying the identifiers of the ones of the network slices to the network traffic based on the determining the ones of the network slices.

4. The method of claim 3, wherein the determining the ones of the network slices includes determining the ones of the network slices based on Quality-of-Services (QoS) values associated with the traffic polices.

5. The method of claim 3, wherein:
the determining the ones of the network slices includes determining that latency, bandwidth, quality, and virtualized network function (VNF) of the network slices match first, second, third, and fourth traffic policies of the traffic policies associated with the network traffic; and
the applying includes applying identifiers of the latency, bandwidth, quality, and VNF network slices to the network traffic associated with the first, second, third, and fourth traffic policies, respectively.

6. The method of claim 1, further comprising, at the data plane of the service provider network:
receiving from the forwarding plane of the enterprise network the network traffic configured with the identifiers of the ones of the network slices; and
steering the network traffic to segment routes of the data plane of the service provider network that implement the network slices according to the identifiers of the ones of the network slices.

7. The method of claim 1, further comprising, at the enterprise controller:
sending to the service gateway the first mappings and the second mappings for sending of the first mappings and the second mappings by the service gateway to control functions of the service provider network responsible for controlling and monitoring the network traffic in the data plane of the service provider network based on the first mappings and the second mappings.

8. The method of claim 7, wherein the control functions include a segment routing controller and a policy monitoring and billing manager of the service provider network, and the method further comprises:
at the segment routing controller, configuring the data plane of the service provider network using the first mappings and the second mappings; and
at the policy monitoring and billing manager, using the first mappings and the second mappings to maintain enterprise user group sessions in the service provider network for monitoring and billing of network usage by network traffic traversing the data plane of the service provider network.

9. The method of claim 7, wherein the first mappings include tuples of a form [user group, traffic policy] and the second mappings include tuples of a form [user group, network slice].

10. The method of claim 7, wherein:
at the service gateway, the sending of the first mappings and the second mappings includes sending the second mappings to a segment routing controller of the control functions of the service provider network that is responsible for configuring the data plane of the service provider network; and
the method further comprises, at the segment routing controller, configuring the data plane of the service provider network with the second mappings to cause the data plane to steer the network traffic, when the network traffic traverses the data plane, based on the second mappings.

11. The method of claim 1, wherein the first mappings include tuples of a form [user group, traffic policy] and the second mappings include tuples of a form [user group, network slice].

12. The method of claim 1, wherein, at the network device:
the configuring the network traffic includes applying, to the network traffic, identifiers of the user groups that are mapped to the ones of the network slices as indicated in the second mappings; and
the forwarding includes forwarding the network traffic configured with the identifiers of the ones of the network slices and the identifiers of the user groups mapped to the ones of the network slices.

13. The method of claim 12, wherein the identifiers of the user groups include security group tags.

14. The method of claim 1, further comprising, at the enterprise controller:
receiving from an identity services engine an identity of a mobile device associated with the enterprise network;
forwarding a device identity register request to an identity-and-authentication service function of the service provider network, through the service gateway, the device identity register request including the identity;
receiving from the identity-and-authentication service function, through the service gateway, a response to the device identity register request including the identity and an indicator that the identity was authenticated successfully; and
responsive to the response, storing the indicator linked to the identity.

15. An apparatus comprising:
a network interface unit; and
a processor of an enterprise controller of an enterprise network coupled to the network interface unit and configured to perform:
sending to a service gateway of a service provider network a request for network slice information about network slices provisioned on a data plane of the service provider network;
maintaining first mappings of user groups for network traffic of the enterprise network to traffic policies to be applied to the network traffic;
determining second mappings of the user groups to ones of the network slices that match the user groups based on the traffic policies and properties associated with the network slices;
responsive to the sending, receiving, from the service gateway, the network slice information including identifiers of the network slices and their properties; and
responsive to receiving a request for the network slice information from a network device at a border of a forwarding plane of the enterprise network, sending the network slice information and the second mappings to the network device to cause the network device to perform configuring the network traffic in the forwarding plane with identifiers of ones of the network slices that match the network traffic based on the second mappings, and to perform forwarding the network traffic configured with the identifiers of the ones of the network slices to the data plane of the service provider network.

16. The apparatus of claim 15, wherein the network slices are $3^{rd}$ Generation Partnership Project (3GPP) 5G slices, and the network slice information includes 5G slice information, such that the identifiers of the network slices include identifiers of the 5G slices and the properties include properties of the 5G slices.

17. The apparatus of claim 15, wherein the processor is further configured to perform:
sending to the service gateway the first mappings and the second mappings for sending of the first mappings and the second mappings by the service gateway to control functions of the service provider network responsible for controlling and monitoring the network traffic in the data plane of the service provider network based on the first mappings and the second mappings.

18. A system comprising:
a network device at a border of a forwarding plane of an enterprise network; and
an enterprise controller of the enterprise network and configured to perform:
   sending to a service gateway of a service provider network a request for network slice information about network slices provisioned on a data plane of the service provider network;
   maintaining first mappings of user groups for network traffic of the enterprise network to traffic policies to be applied to the network traffic;
   determining second mappings of the user groups to ones of the network slices that match the user groups based on the traffic policies and properties associated with the network slices;
   responsive to the sending, receiving, from the service gateway, the network slice information including identifiers of the network slices and their properties; and
   responsive to receiving a request for the network slice information from the network device, sending the network slice information and the second mappings to the network device;

wherein the network device is configured to perform:
   responsive to the network slice information and the second mappings, configuring network traffic in the forwarding plane with identifiers of ones of the network slices that match the network traffic based on the second mappings; and
   forwarding the network traffic configured with the identifiers of the ones of the network slices to the data plane of the service provider network.

19. The system of claim 18, wherein the network slices are $3^{rd}$ Generation Partnership Project (3GPP) 5G slices, and the network slice information includes 5G slice information, such that the identifiers of the network slices include identifiers of the 5G slices and the properties include properties associated with the 5G slices.

20. The system of claim 18, wherein the network device is configured to perform the configuring the network traffic by:
   determining the ones of the network slices that match the network traffic based on the traffic policies associated with the network traffic as defined in the enterprise network and the properties associated with the network slices; and
   applying the identifiers of the ones of the network slices to the network traffic based on the determining the ones of the network slices.

* * * * *